US006564575B1

United States Patent
Schroeder et al.

(10) Patent No.: US 6,564,575 B1
(45) Date of Patent: May 20, 2003

(54) ACCUMULATOR WITH INLET PORT COMPRISING A DEFLECTOR

(75) Inventors: Fred G. Schroeder, Grosse Ile, MI (US); Zhongping Zeng, Haslett, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/999,619

(22) Filed: Oct. 30, 2001

(51) Int. Cl.[7] .............................................. F25B 43/00
(52) U.S. Cl. .......................................... 62/503; 62/324
(58) Field of Search ..................... 62/503, 324

(56) References Cited

U.S. PATENT DOCUMENTS

| | | | | |
|---|---|---|---|---|
| 4,182,136 A | * | 1/1980 | Morse | 62/503 |
| 4,458,505 A | * | 7/1984 | Griffin | 62/503 |
| 4,651,540 A | * | 3/1987 | Morse | 62/503 |
| 5,184,479 A | * | 2/1993 | Koberstein et al. | 62/503 |
| 5,904,055 A | * | 5/1999 | Slais | 26/503 |
| 5,950,596 A | * | 9/1999 | Kollmann | 123/198 |
| 6,026,655 A | * | 2/2000 | Griffin et al. | 62/503 |
| 6,062,039 A | * | 5/2000 | Haramoto et al. | 62/503 |

* cited by examiner

Primary Examiner—William C. Doerrler
Assistant Examiner—Mark Shulman
(74) Attorney, Agent, or Firm—Brinks Hofer Gilson & Lione

(57) ABSTRACT

An accumulator with an inlet port comprising a deflector for use in an air conditioning or refrigeration system, and a method for use thereof are disclosed. In operation, the accumulator is provided between the evaporator and compressor of an air conditioning or refrigeration system. Vaporized refrigerant is conveyed from the evaporator into the accumulator through an inlet port having a deflector. The deflector deflects the refrigerant from the inlet port in a spray pattern to reduce the velocity of the refrigerant thereby avoiding turbulence in the accumulator. In another embodiment, a vapor conduit inside the accumulator for conveying refrigerant to an outlet port has an open vapor inlet end with chamfered cut edges pointing away from the inlet port to avoid liquid from splashing into the vapor conduit.

22 Claims, 6 Drawing Sheets

ACCUMULATOR WITH INLET PORT COMPRISING A DEFLECTOR

BACKGROUND OF THE INVENTION

This invention relates to an accumulator for use in an air conditioning or refrigeration system and to a method for use thereof. In particular, this invention relates to an accumulator with an inlet port having a deflector. The accumulator of the present invention may be used with a variety of refrigerants including r134a and carbon dioxide, despite the higher operating pressures inherent in a system using carbon dioxide as the refrigerant.

A basic refrigeration or air conditioning system has a compressor, a condenser, an expansion device, and an evaporator. These components are generally serially connected via conduit or piping and are well known in the art. During operation of the system, the compressor acts on relatively cool gaseous refrigerant to raise the temperature and pressure of the refrigerant. From the compressor, the high temperature, high pressure gaseous refrigerant flows into the condenser where it is cooled and exits the condenser as a high pressure liquid refrigerant. The high pressure liquid refrigerant then flows to an expansion device, which controls the amount of refrigerant entering into the evaporator. The expansion device lowers the pressure of the liquid refrigerant before allowing the refrigerant to flow into the evaporator. In the evaporator, the low pressure, low temperature refrigerant absorbs heat from the surrounding area and exits the evaporator as a saturated vapor having essentially the same pressure as when it entered the evaporator. The suction of the compressor then draws the gaseous refrigerant back to the compressor where the cycle begins again.

In a typical air conditioning or refrigeration system, it is necessary to prevent liquid from passing from the evaporator into the compressor in order to avoid damage to the compressor. When liquid refrigerant enters a compressor, it is known as slugging. Slugging reduces the overall efficiency of the compressor and can also damage the compressor. It is well known in the art to mount a suction line or low pressure side accumulator between the evaporator and compressor. Such suction line accumulators act to separate the liquid and gaseous phases of the refrigerant flowing from the evaporator. The refrigerant from the evaporator enters the accumulator through an inlet port at a relatively high velocity. The liquid phase of the refrigerant will settle to the bottom of the accumulator while the gaseous phase will rise to the top of the accumulator and will be suctioned out of the accumulator by the compressor.

In order to achieve sufficient separation of the gaseous and liquid phases of the refrigerant, it is necessary to reduce the turbulence of the liquid in the accumulator. Several systems and methods have been employed in the past in an effort to reduce the turbulence in accumulators. For example, U.S. Pat. No. 3,609,990 to Bottum discloses bending the lower portion of the inlet port slightly towards the interior wall of the accumulator so that the liquid and gas flows out of the inlet tube at a downward angle in a direction tangential to the accumulator wall. U.S. Pat. Nos. 3,643,466, 3,837,177, and 5,167,128 all to Bottum disclose an inlet port with a portion of one wall deformed inwardly into the port to form a scoop for directing the flow of liquid and gaseous refrigerant entering the accumulator toward the interior wall of the accumulator. U.S. Pat. No. 5,660,058 discloses the use of a domed shaped deflector below the inlet port to effectively separate the liquid and gaseous phases of the refrigerant and reduce turbulence.

While the above accumulators are suitable for their intended purpose, it is believed that there is a demand in the industry for an accumulator with an improved inlet port, which can separate the liquid, and gaseous phases of the refrigerant entering the accumulator while at the same time reduce turbulence. It is further believed that there is a demand for an accumulator with an improved inlet port which is less costly to manufacture, but yet provides a high level of efficiency.

BRIEF SUMMARY OF THE INVENTION

In a preferred embodiment, an inlet port for an air conditioning or refrigeration system accumulator comprises a conduit for conveying refrigerant, the conduit having an upper end and a lower end, and a deflector formed at the lower end of the conduit, the deflector having a planar deflecting surface.

In another embodiment, an accumulator for an air conditioning or refrigeration system comprises a housing having a chamber formed by a sidewall, a bottom wall, and a cover, an inlet port for conveying refrigerant, the inlet port comprising a deflector, wherein refrigerant flowing through the inlet port strikes the deflector and is deflected in an arc, an outlet port, and a vapor conduit having a vapor inlet positioned inside the chamber for conveying refrigerant in the accumulator to the outlet port.

In another aspect, an accumulator for an air conditioning or refrigeration system comprises a housing having a chamber formed by a sidewall, a bottom wall, and a cover, an inlet port for conveying refrigerant, an outlet port for discharging refrigerant from the accumulator, and a vapor conduit inside the chamber for conveying refrigerant in the accumulator to the outlet port, the conduit having a vapor inlet with chamfered edges pointing away from the inlet port.

In yet another aspect, a method of operating an air conditioning or refrigeration system is provided. First, the refrigerant is conveyed from a compressor to a condenser. Next, the refrigerant is conveyed from the condenser to an expansion device. Then, the refrigerant is conveyed from the expansion device to an evaporator. Next, the refrigerant is conveyed from the evaporator to an inlet port of an accumulator. Then, the refrigerant conveyed through the inlet port is deflected into an arc into the accumulator. Next, the refrigerant in the accumulator is conveyed through a vapor conduit inside the accumulator to an outlet port. Finally, the refrigerant is discharged through the outlet port to the compressor.

The present invention provides significant advantages over the prior art by providing cost-efficient systems and methods to further reduce turbulence of liquid inside an accumulator.

Further features and advantages of the present invention will be apparent upon reviewing the following detailed description and accompanying drawings.

DETAILED DESCRIPTION OF THE INVENTION

Figure 1:
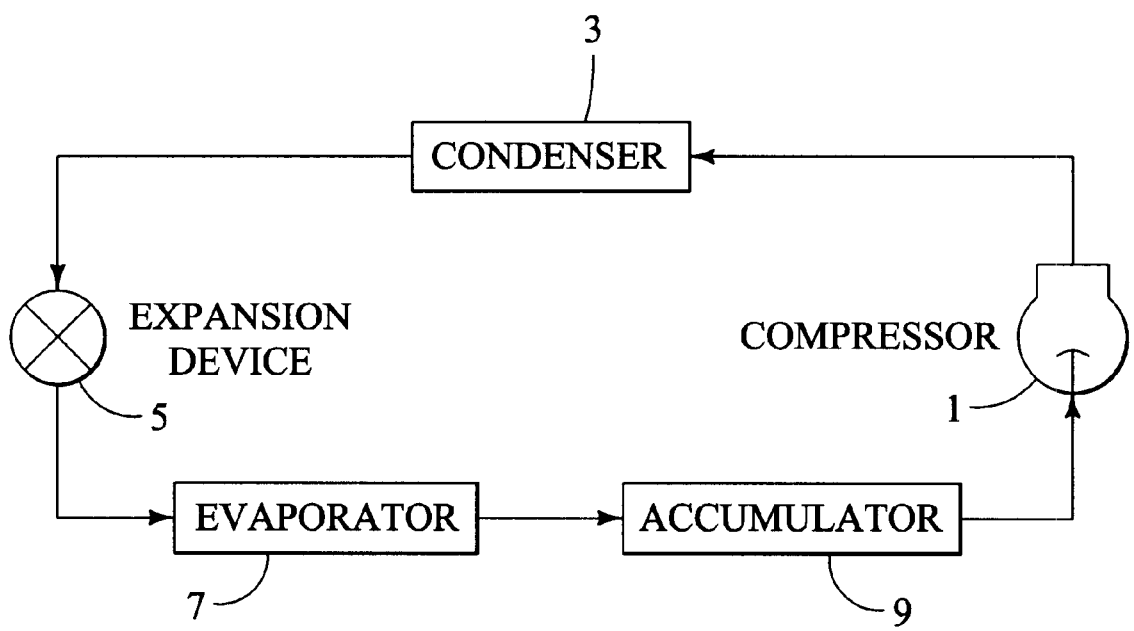
FIG. 1 is a schematic of one embodiment of an air conditioning system using an accumulator of the present invention.

FIG. 1 is a schematic of an air conditioning system incorporating the accumulator and inlet port of the present invention. In general, high pressure, high temperature refrigerant exits a compressor 1 and flows into a condenser 3. The high temperature liquid refrigerant exits the condenser and flows into an expansion device 5 and subsequently into an evaporator 7. Low pressure refrigerant exits the evaporator 7 and enters the accumulator 9 where the liquid and gaseous phases of the refrigerant are separated. Gaseous refrigerant is then suctioned out of the accumulator 9 and flows back to the compressor 1. It also should be understood that the accumulator of the present invention may contain an internal heat exchanger and be incorporated into both the high pressure and low pressure sides of the system. A detailed discussion of such an accumulator is provided in U.S. patent application Ser. No. 09/752,419, filed Dec. 29, 2000, which is hereby incorporated by reference.

Figure 2:
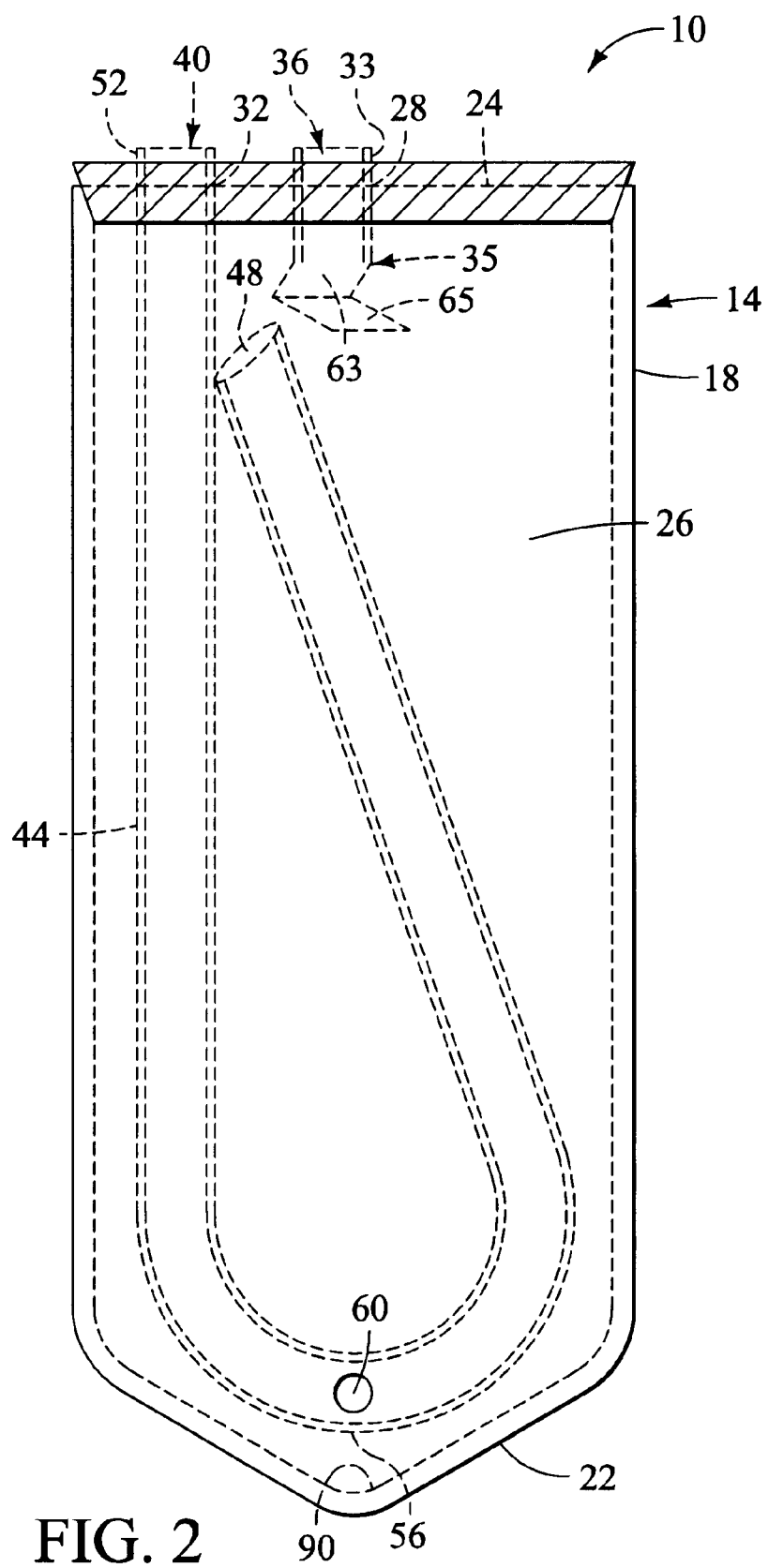
FIG. 2 is a front cut-away view of one embodiment of the accumulator of the present invention having an inlet port deflector.

As illustrated in FIG. 2, the accumulator 10 includes a housing 14, with sidewalls 18, a bottom wall 22, and a cover 24, forming a chamber 26. The sidewalls 18 and the bottom wall 22 are preferably integrally formed to form the lower portion of the accumulator 10. The cover 24 is separately formed from the housing and forms the upper portion of the accumulator 10. While the accumulator shown in the figures is cylindrical in shape, the accumulator of the present invention may have any shape, including square, rectangular or ellipsoidal. The accumulator is preferably stainless steel, but also may be aluminum, copper, or any other suitable material.

The cover 24 has two openings 28 and 32 for receiving a low pressure inlet port 36 and a low pressure outlet port 40 respectively. The inlet port 36 has an upper end 33 and a lower end 35. The openings 28 and 32 may be circular, elliptical, square, rectangular, or any other desired shape. The low pressure inlet port 36 and low pressure outlet port 40 generally correspond in shape to the openings 28 and 32 in the top of the cover 24. In a preferred embodiment, the openings 28 and 32 are circular, and the low pressure inlet port 36 and low pressure outlet port 40 are cylindrical in shape. The low pressure inlet port 36 and low pressure outlet port 40 may be formed from aluminum, stainless steel, copper, or any other suitable material. Preferably, the inlet and outlet ports are formed from stainless steel.

A vapor conduit 44 with a vapor inlet end 48 and a vapor outlet end 52 is positioned inside the housing 14. The vapor outlet end 52 is connected to the low pressure outlet port 40. The vapor outlet end 52 may be affixed to the low pressure outlet port 40 by soldering, brazing, welding, or any other suitable method known in the art. In other embodiments, the vapor outlet end 52 and the low pressure outlet port 40 may comprise one piece. Preferably, the vapor conduit 44 is a stainless steel cylindrical J-shaped tube or J-tube. However, the vapor conduit 44 may have any other desirable shape, including linear, and may be formed from any suitable material such as aluminum or copper. The vapor conduit 44 extends vertically from the vapor outlet end 52 into the lower portion of the housing 14 adjacent the bottom wall 22, and is curved at its lower-most point 56. The J-shaped vapor conduit 44 extends upwardly from the lower most point 56 to the vapor inlet end 48.

The J-shaped vapor conduit 44 has one or more openings 60 in the curved portion of the tube, which allows liquid refrigerant accumulated in the bottom of the accumulator to be drawn through the opening 60 into the J-shaped vapor conduit 44, and out of the accumulator through the vapor outlet end 52 connected to the low pressure outlet port 40. In alternative embodiments, oil from a sump 90 at the bottom of the housing 14 may be drawn into the J-shaped vapor conduit through the opening 60 where the oil mixes with the gaseous refrigerant flowing through the tube and out of the low pressure outlet port 40.

Figure 4:
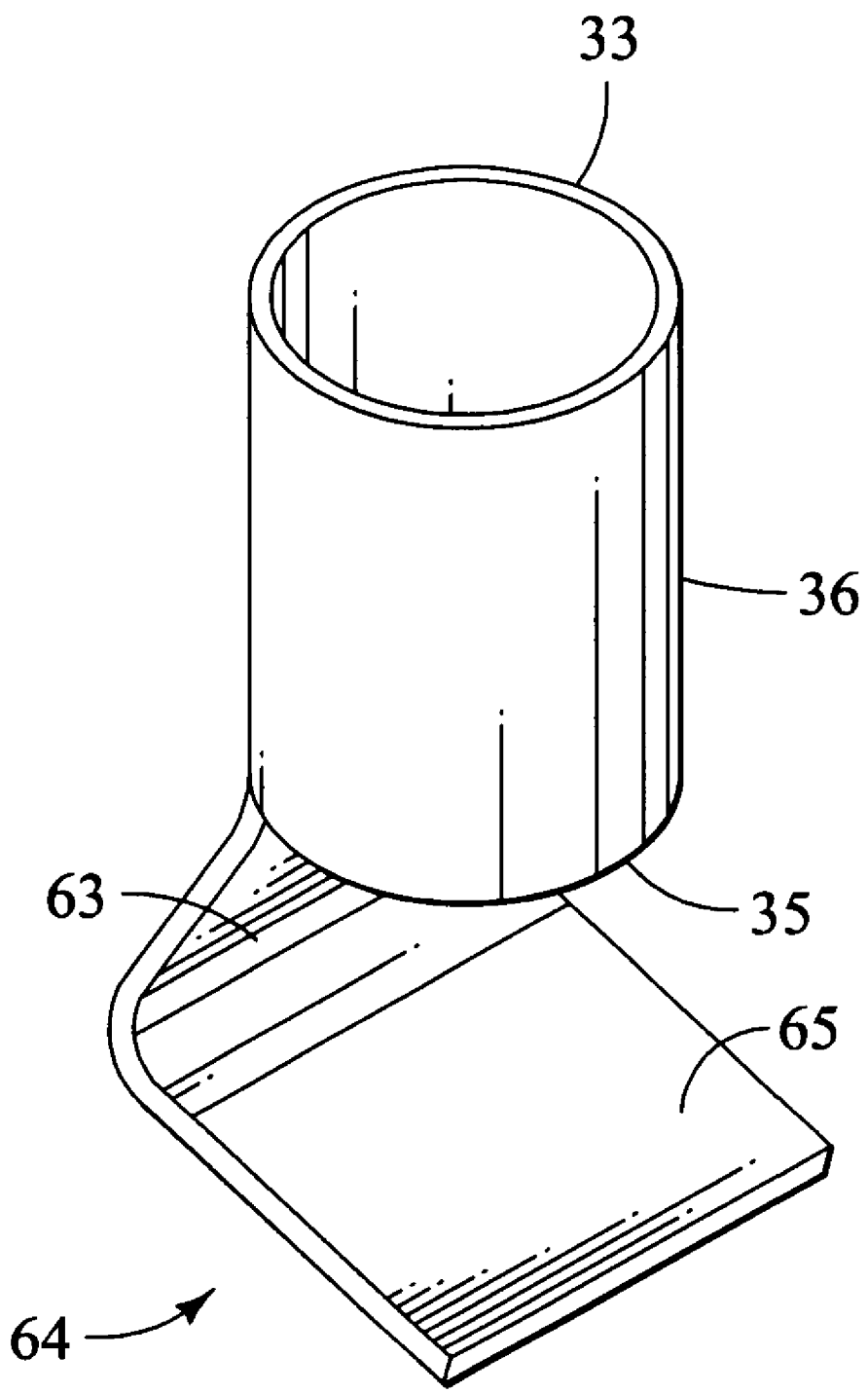
FIG. 4 is a close-up perspective view of one embodiment of an inlet port deflector.
Figure 5A:
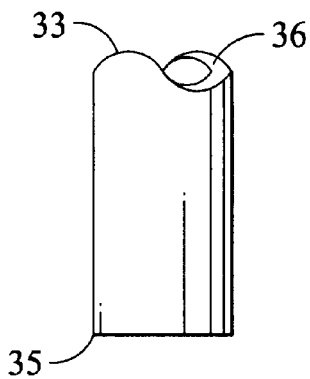
FIGS. 5 A–D shows a perspective view of one embodiment of the various stages of an inlet port deflector as it is manufactured.
Figure 5B:
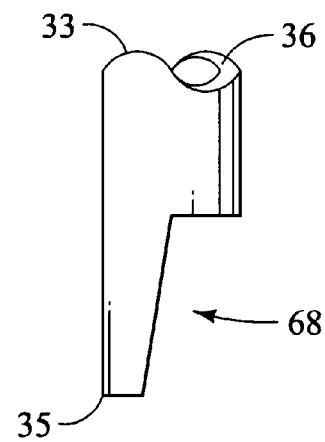
Figure 5C:
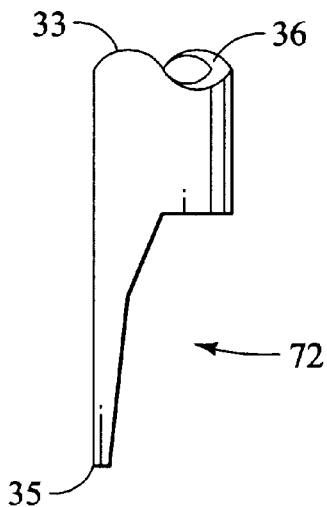
Figure 5D:
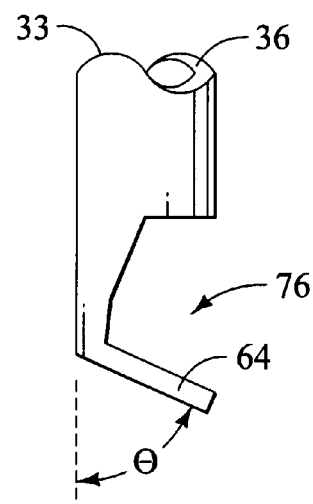

As shown in FIGS. 2 and 4, the low pressure inlet port 36 has a deflector 64. A sidewall 63 and a deflecting surface 65 form the generally L-shaped deflector 64. The inlet port deflector 64, of which a close-up view is shown in FIG. 4, is formed at the lower end 35 of the inlet port 36 and extends away from the generally vertical inlet port 36 towards the sidewall 18. The inlet port deflector 64 may have a deflection angle θ, shown in FIG. 5D ranging from 45 to 90 degrees from the bottom of the port. In a preferred embodiment, the inlet port deflector 64 has a deflection angle of about 75 degrees. The deflecting surface 65 is preferably- shaped in the form of a rectangle or square, but may be other shapes such as circular, elliptical, or any other suitable shape. The inlet port deflector 64 may be formed integrally from the inlet port or may be separately formed and affixed to the lower end 35 of the inlet port by soldering, brazing, welding, or any other suitable method. In a preferred embodiment, the inlet port 36 and the deflector 64 are integrally formed.

If the deflector 64 is formed separately from the inlet port, the deflector may be aluminum, stainless steel, copper, or any other suitable material. Preferably, a deflector 64, which is formed separately from the inlet port, is the same material as the inlet port. In a preferred embodiment the inlet port 36 and the deflector 64 are stainless steel.

FIGS. 5A–D show one method of forming an inlet port deflector. First, an inlet port 36 is provided. The inlet port is preferably cylindrical, but may be other shapes. Next, a notched step 68 is formed into the inlet port 36. The notched step may be machined or cut. Then, the notched step 68 is flattened as shown at 72. Finally, the flattened notched step is bent to form the deflector 64 with the correct profile angle θ as shown at 76.

Figure 3:
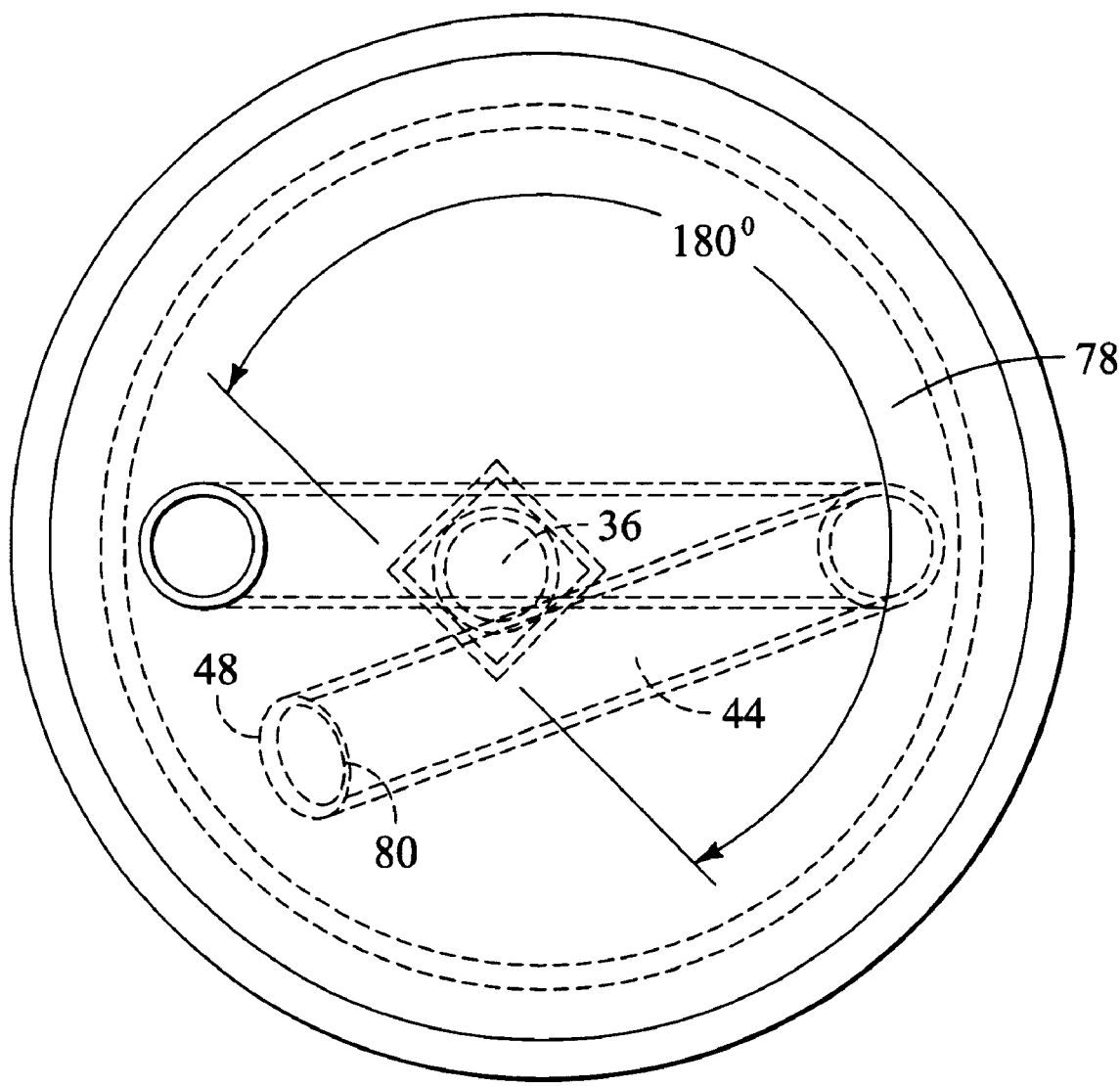
FIG. 3 is a top cut-away view of the embodiment shown in FIG. 2.

In operation, low pressure, low temperature refrigerant flowing from the evaporator at a relatively high velocity enters the accumulator 10 through the inlet port 36. The refrigerant strikes the deflecting surface 65 and flows off of the deflector toward the sidewall 18 of the accumulator and away from the vapor inlet 48 in an arc or fan-shaped pattern 78 as shown in FIG. 3. In one embodiment, the arc through which the refrigerant is sprayed is from about 45 to 180 degrees. In a preferred embodiment, the arc is 180 degrees.

The deflector slows down the velocity of the refrigerant entering the accumulator while directing the refrigerant flow down the sidewall 18 of the accumulator housing 14. Any liquid refrigerant flows down the sidewall 18 in a laminar fashion while the gaseous refrigerant rises to the upper portion of the accumulator and flows into the vapor inlet 48 of the J-tube. As a result, the incoming refrigerant is not directed at a high velocity against any standing liquid refrigerant, which may be retained in the lower portion of the housing 14. Undesired turbulence of the standing liquid is therefore minimized which further prevents liquid refrigerant from entering the vapor inlet 48.

The vapor, which flows into the J-tube, passes downwardly through the vapor conduit 44 reaching its lower-most point 56. The suction of the gas allows the liquid refrigerant and oil mixture accumulated in the bottom of the accumulator to be drawn through the opening 60 into the J-shaped vapor conduit 44, where it is then sucked upwardly along the J-shaped to vapor conduit 44 and out of the accumulator through the vapor outlet end 52 connected to the low pressure outlet port 40. It is to be understood that the liquid refrigerant and oil mixture, which is metered into the vapor conduit 44 through the opening 60, is entrained in the stream of gaseous refrigerant. It remains entrained in the gas as it passes from the accumulator and is drawn to the compressor of the system. The opening 60 allows the liquid refrigerant to be metered into the compressor at a controlled rate, thereby avoiding large amounts of liquid refrigerant from entering and damaging the compressor.

The present invention has system efficiency, cost, and complexity improvements over the prior art. The design limits the turbulence of the refrigerant in the accumulator. Further, the deflector may be integral to the inlet port, which reduces part and manufacturing costs as well as the complexity of the accumulator. Additionally, the present invention allows the liquid storage capacity of the accumulator to be increased by allowing the inlet of the vapor conduit to be near the top of the accumulator.

In another embodiment, as shown in FIG. 3, the vapor inlet end 48 of the vapor conduit 44 is trimmed with an angled or chamfered cut 80, with the opening pointing directly away from the inlet port 36. This, on one hand, serves to block liquid particles from entering the vapor inlet end 48 of the vapor conduit 44, and on the other hand, increases the flow area and reduces the pressure drop in the vapor conduit 44. It also serves to prevent restriction if the vapor conduit 44 is bottomed against the inside top of the accumulator 10. Similarly, the chamfered cut is desirable for functioning because the vapor conduit 44 can be positioned higher in the housing 14 to allow for greater liquid storage capacity within the accumulator 10. It is recognized that the chamfered cut 80 may be utilized independently of the inlet port deflector 64, or in combination thereof.

Figure 6:
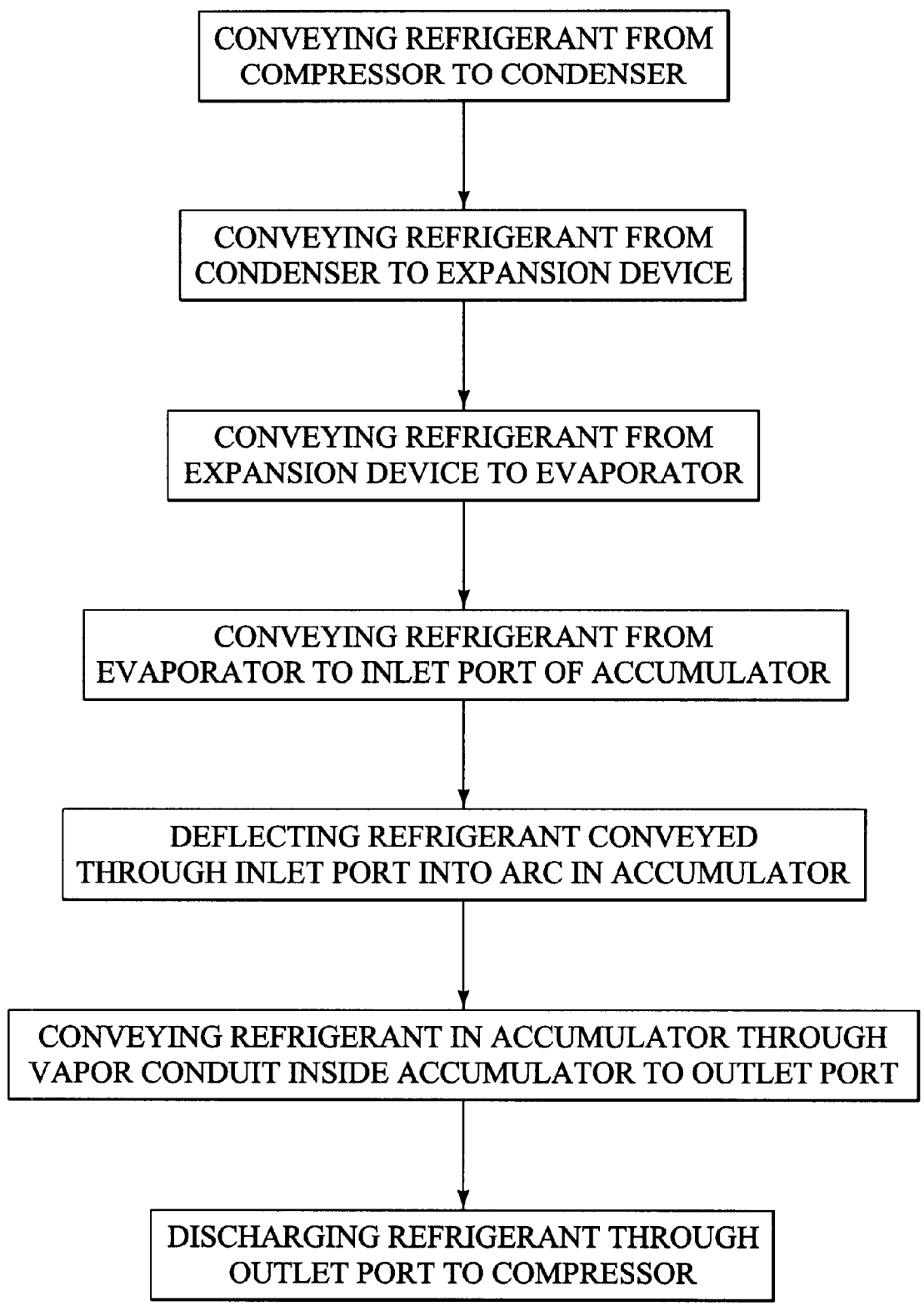
FIG. 6 is a flow chart of one embodiment of a method of operating an air conditioning or refrigeration system using an accumulator of the present invention.

A method of operating an air conditioning or refrigeration system is shown in the flowchart in FIG. 6. First, refrigerant is conveyed from a compressor into a condenser. Refrigerant from the condenser is then conveyed to an expansion device. The refrigerant is then conveyed from the expansion device to an evaporator. Refrigerant from the evaporator is conveyed to an inlet port of an accumulator. The accumulator further comprises a housing forming a chamber, an outlet port, and a vapor conduit inside the chamber. Refrigerant conveyed through the inlet port is deflected into an arc such that any liquid refrigerant flows down the sides of the housing, and any gaseous refrigerant flows into a vapor conduit. Finally, the refrigerant in the vapor conduit is discharged through an outlet port and flows back to the compressor.

While the invention with its several embodiments has been described in detail, it should be understood that various modifications may be made to the present invention without departing from the scope of the invention. The following claims, including all equivalents define the scope of the invention.

What is claimed is:

1. An inlet port for an air conditioning or refrigeration system accumulator comprising:
    a conduit for conveying refrigerant, said conduit having an upper end and a lower end; and
    a deflector formed at the lower end of said conduit, said deflector having a planar deflection surface, wherein the deflection surface is located a distance away from the lower end.

2. The inlet port of claim 1, wherein the deflection surface is spaced apart from the lower end of the conduit.

3. The inlet port of claim 1 wherein the deflector is formed integrally with the conduit.

4. The inlet port of claim 1, wherein refrigerant conveyed through the conduit strikes the deflector and is deflected in an arc.

5. The inlet port of clam 4, wherein the arc is from about 45 to 180 degrees.

6. The inlet port of claim 1, wherein the deflector has a deflection angle from about 45 to 90 degrees.

7. An accumulator for an air conditioning or refrigeration system comprising:
    a housing having a chamber formed by a sidewall, a bottom wall, and a cover;
    an inlet port for conveying refrigerant, said inlet port comprising a deflector, wherein the deflector has a planar deflection surface, wherein refrigerant flowing through the inlet port strikes the deflection surface upon exiting the inlet port, and wherein the refrigerant is deflected in an arc;
    an outlet port; and
    a vapor conduit having a vapor inlet positioned inside the chamber for conveying refrigerant in the accumulator to the outlet port.

8. The accumulator of claim 7, wherein the housing is cylindrical and the low pressure inlet and outlet ports extend through two corresponding openings in the cover.

9. The accumulator of claim 7, wherein the deflector has a deflection angle ranging from about 45 to 90 degrees.

10. The accumulator of claim 7, wherein the arc is from about 45 to 180 degrees.

11. The accumulator of claim 7, wherein the deflector further comprises a generally planar deflecting surface which is square.

12. The accumulator of claim 7, wherein the deflector deflects the refrigerant toward the sidewall and away from the vapor inlet.

13. The accumulator of claim 7 wherein the vapor inlet has a chamfered edge pointing away from the inlet port.

14. The accumulator of claim 7, wherein the deflector comprises a metal, said metal selected from the group consisting of aluminum, copper and stainless steel.

15. An accumulator for an air conditioning or refrigeration system comprising:
    a housing having a chamber formed by a sidewall, a bottom wall, and a cover;
    an inlet port for conveying refrigerant wherein the inlet port has an upper end and a lower end;
    an outlet port for discharging refrigerant from the accumulator;
    a deflector formed at the lower end of the inlet port, the deflector having a planar deflection surface, wherein the deflection surface is located a distance away from the lower end; and
    a vapor conduit inside the chamber for conveying refrigerant in the accumulator to the outlet port, said conduit having a vapor inlet with chamfered edges pointing away from the inlet port.

16. The accumulator of claim 15, wherein the inlet port comprises a deflector wherein refrigerant conveyed through the inlet port strikes the deflector and deflects the refrigerant in an arc.

17. The accumulator of claim 15 wherein the deflector has a deflection angle ranging from about 45 to 90 degrees.

18. The accumulator of claim 15 wherein the arc is from about 45 to 180 degrees.

19. A method of operating an air conditioning or refrigeration system comprising:

conveying a refrigerant from a compressor to a condenser;

conveying the refrigerant from the condenser to an expansion device;

conveying the refrigerant from the expansion device to an evaporator;

conveying the refrigerant from the evaporator to an inlet port of an accumulator;

deflecting refrigerant that has exited the inlet port into an arc and into the accumulator;

conveying refrigerant in the accumulator through a vapor conduit inside the accumulator and to an outlet port; and discharging refrigerant through the outlet port to the compressor.

20. The method of claim 19, wherein the inlet port further comprises a deflector having a planar deflecting surface.

21. The method of claim 19, wherein the refrigerant is deflected in an arc from about 45 to 180 degrees.

22. The method of claim 19, wherein the vapor conduit has an inlet, said vapor inlet having a chamfered edge pointing in a direction opposite the inlet port.

\* \* \* \* \*